United States Patent [19]

McGlothlin et al.

[11] Patent Number: 5,558,171
[45] Date of Patent: Sep. 24, 1996

[54] WELL DRILLING PROCESS AND CLAY STABILIZING AGENT

[75] Inventors: Raymond E. McGlothlin; Frank B. Woodworth, both of Houston, Tex.

[73] Assignee: M-I Drilling Fluids L.L.C., Houston, Tex.

[21] Appl. No.: 232,386

[22] Filed: Apr. 25, 1994

[51] Int. Cl.$^6$ .............................. C09K 7/02; E21B 21/00
[52] U.S. Cl. .................. 175/64; 175/65; 175/72; 507/128; 507/129; 507/131
[58] Field of Search ........................... 507/128, 129, 507/131, 904; 175/64, 65, 72

[56] References Cited

U.S. PATENT DOCUMENTS

| | | |
|---|---|---|
| 2,761,835 | 9/1956 | Brown . |
| 2,761,843 | 9/1956 | Brown . |
| 2,873,251 | 2/1959 | Jones . |
| 3,127,344 | 3/1964 | DeGroote . |
| 3,200,106 | 8/1965 | Dickson . |
| 4,782,120 | 11/1988 | Rousset et al. ............ 525/326.6 |
| 4,816,551 | 3/1989 | Oehler et al. ............ 528/295.3 |
| 4,853,465 | 8/1989 | Cowan et al. ............ 530/506 |
| 4,957,639 | 9/1990 | Fox ........................ 166/275 X |
| 5,149,690 | 9/1992 | Patel ........................ 507/131 |

Primary Examiner—George A. Suchfield
Attorney, Agent, or Firm—Arnold, White & Durkee

[57] ABSTRACT

The invention relates to clay stabilizing agents for use in an alkaline water-base fluid such as a drilling mud and the use of such clay stabilizing agents in the drilling of wells. The clay stabilizing agent comprises a polyfunctional polyamine reaction product prepared by the reaction of a polyamine base reactant with urea or a dialkylcarbonate or by reaction with urea and a dialkylcarbonate. The stabilizing agent is subject to subsequent acidification to reduce the pH thereof to a value of about 7 or less. The polyamine base reactant is selected from the group consisting of an aliphatic polyamine, a polyaliphatic polyamine, a heterocyclic polyamine, an alkylalkanol polyamine and mixtures thereof. Specifically, the base reactant comprises an aliphatic polyamine selected from the group consisting of ethylenediamine, diethylenetriamine, tetraethylenetetramine, and tetraethylenepentamine and mixtures thereof. Preferably the base reactant has at least three amino groups and a molecular weight within the range of 100–300 and more preferably 100–200. A low molecular weight alkyl acid phosphate, specifically, ethyl acid phosphate, propyl acid phosphate, butyl acid phosphate and mixtures thereof, can also be used. Preferably this supplement comprises ethyl acid phosphate. The alkyl acid phosphate may be added to the stabilizing agent in an aqueous solution subsequent to acidification of the product.

14 Claims, No Drawings

WELL DRILLING PROCESS AND CLAY STABILIZING AGENT

FIELD OF THE INVENTION

This invention relates to the drilling of wells into the earth's crust and, more particularly, to the use of water-based drilling muds and the formulations of mud additives and incorporation of such additives into such drilling muds.

BACKGROUND OF THE INVENTION

Wells are drilled into the earth's crust to desired subterranean formations, e.g., oil- and/or gas-beating formations, through the application of rotary drilling techniques. In the rotary drilling of a well, a drilling fluid is circulated through the well in order to remove the cuttings therefrom. The drilling fluid is pumped downwardly through a rotating drill string within the well and thence upwardly to the surface of the well through the annulus surrounding the drill string. The drill cuttings are entrained in the drilling fluid and withdrawn from the well with the fluid. In addition to removing cuttings, the drilling fluid also serves other functions such as lubricating the drill string and bit, cooling the drill bit, and providing sufficient hydrostatic pressure down hole to prevent the flow of formation fluids into the well.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either an aqueous base mud or an oil-base mud. While oil-base muds are used most advantageously where the formation being drilled is a suspected oil or gas producer, it usually is desirable to use a water-base mud throughout most of the drilling operation. The water-base mud may be a freshwater mud, a salt-water mud, or an emulsion mud formed by an oil-in-water emulsion in which the water is the continuous phase.

One difficulty which has long been experienced with the use of water-base drilling muds is the deleterious effects of the water in the drilling mud on certain formations penetrated by the drilling procedure. For example, so-called soft shales, which are relatively unstable clay-containing formations, upon contact by the aqueous drilling fluid tend to hydrate such that sloughing occurs. This sloughing or influx of the shale or other earth formation into the well during the drilling operation often leads to serious and costly problems, such as stuck drill pipe, undesired hole enlargement, and even such extreme instability as to cause loss of the well because of inability to proceed with the drilling operation. Desirably, the mud forms a thin permeable coating on the walls of the borehole to reduce loss of water from the borehole to the formation, thereby reducing softening of the borehole walls and sloughing into the hole.

In water-based drilling muds, days are used to provide desirable viscosity and filtration properties. However, in the course of the drilling operation, clays from formation solids that become dispersed because of borehole instability can be a major problem in certain formations. Drilling in gumbo type formations, high in montmorillonite, can be troublesome and expensive.

Clay mineral particles have internal chemical defects that produce localized negative charges on the surfaces of the platelets. These negative charges are electrostatically balanced by cations surrounding the clay particles and forming ionic clouds around them. These cations are characterized as exchangeable cations of the clay particles because they can be exchanged with other ions under certain conditions, such as by contacting the clay particles and aqueous solutions of other ions. The electric charges on clay particles generate electrostatically repulsive forces whereas the mass of clay particles give rise to van der Waals' attractive forces. The net result of these attractive and repulsive forces determines whether the clay particles will be in a coagulated or dispersed state when in contact with an aqueous fluid. The smaller the cationic cloud around each particle, or the more contracted the electric double layer, the more effective the neutralization of the localized negative charges on the surface of the clay platelets will be. Effective neutralization of the negative charge on clay platelets by cations tends to cause coagulation or shrinking of clay particles. Expansion of the electric double layers of clay platelets leads to swelling and dispersion of clay particles.

The sensitivity of gumbo clay containing formations in contact with fresh water is increased by exposure to monovalent ions such as sodium and hydrogen. The primary reason for the dispersion of clays is expansion of clay particles due to hydration of the sodium cations which are adsorbed between platelet faces. The readily hydratable sodium ions adsorbed on the clay particles attracts a large number of molecular layers of water causing expansion between clay platelets and thus weakening the van der Waals' forces tending to hold the particles together.

The prior art involves various techniques which have been proposed in order to alleviate the problems associated with clay hydration and swelling. Such techniques involve the use of anionic or cationic suffactants, the use of oil slugs interposed in the water-base mud, and the use of salts such as sodium or calcium chloride.

One class of additives for use in inhibiting clay hydration is based upon polyamine structures carrying various functional groups which work to render the clays resistant to swelling with the attendant problems of sloughing and even plugging of the borehole and damage to desirable oil or gas formations. For example, U.S. Pat. No. 2,761,843 to Brown discloses a clay treating mechanism in drilling operations which is described as involving an ion exchange reaction between exchangeable cations on the clay and substituted ammonium ions in the treating solution. Here, substituted ammonium ions are derived from a basic aliphatic polyamine such as diethylenetriamine (DETA), triethylenetetramine TETA), tetraethylenepentamine (TEPA), and various other higher molecular weight polyamines.

Another procedure for use in the formulation of clay inhibiting drilling fluids is disclosed in U.S. Pat. No. 2,873,251 to Jones. Here various polyamine salts are formed in situ within a drilling fluid by the addition of a polyamine such as triethylenetetramine with a reactant such as an organic acid, e.g. acetic acid, followed by the addition of a thickening agent such as carboxymethylcellulose. An optimum treatment is described in Jones as involving about two pounds per barrel of triethylenetetramine, 3 pounds per barrel of acetic acid, and four pounds per barrel of sodium carboxymethylcellulose. As in the patent to Brown, various other polyamines are disclosed as useful precursors.

Similarly, polyamine based drilling fluid additives and their use are disclosed in U.S. Pat. No. 3,127,344 to De Groote. Here a wide range of polyamines are disclosed as starting materials including polyalkylene polyamines as described above and in addition cycloalkyl and aromatic polyamines. The amines may be characterized as nonhydroxlated or hydroxylated alkylene polyamino mines ranging from diethylenetriamine to tetrabutylenepentamine, used either singularly or in mixtures. Various cyclic amines include heterogenous 5 and 6 member rings. Acylating agents which can be reacted with the base polyamine product include carboxylic acids which can contain functional groups such as hydroxy groups. Alpha hydroxy acids such as glycolic acid (hydroxyacetic acid) and lactic acid, are particularly disclosed. Polycarboxylic acids can also be used.

Additional polyalkylene polyamine products useful as drilling mud additives, as well as in various other applications such as emulsifiers and deemulsifiers, are disclosed in U.S. Pat. No. 3,200,106 to Dickson et at. The products disclosed in Dickson are derived from branched polyamines by various reaction routes involving acylation, alkylation, oxyalkylation and various combinations thereof, such as acylation followed by oxyalkylation and the corresponding reverse procedure, oxyalkylation followed by acylation. Other products are derived by olefination and carboxylation in which the branched chain polyamine precursor is reacted with ketones or aldehydes such as formaldehyde. Suitable acids useful in the acylation procedures include mono- and poly- carboxylic acids containing other functional groups such as hydroxyacetie acid.

Various drilling fluid additives useful in controlling clay swelling are also disclosed in U.S. Pat. No. 5,149,690 to Patel et at. Here, the drilling fluid additives are formed by the reaction of an aliphatic polyamine such as diethylenetriamine or triethylenetetramine with a polyfunctional aliphatic acid such chloroacetic acid or hydroxyacetic acid as described above. Upon completion of the reaction between the amine and the acid, potassium hydroxide is added to the resulting product to raise the pH to about 7.0.

SUMMARY OF THE INVENTION

In accordance with the present invention there is provided a novel clay stabilizing agent for use in an alkaline water-base fluid such as drilling fluid or other well surfacing fluid. The clay stabilizing agent comprises a polyfunctional polyamine reaction product prepared by the reaction of a polyamine based reactant with urea to an intermediate reaction product which in turn is reacted with a dialkylcarbonate. The stabilizing agent is subject to subsequent acidification to reduce the pH thereof to a value of about 7 or less. The polyamine base reactant is selected from the group consisting of an aliphatic polyamine, a polyaliphatic polyamine, a heterocyclic polyamine, an alkylalkanol polyamine and mixtures thereof. Preferably, the base reactant comprises an aliphatic polyamine selected from the group consisting of ethylenediamine, diethylenetriamine, tetraethylenetetramine, and tetraethylenepentamine and mixtures thereof. Preferably the base reactant has at least three amino groups and a molecular weight within the range of 100–300 and more preferably 100–200.

In a further aspect of the invention, there is provided a method of drilling a subterranean formation with a water based drilling fluid. The drilling fluid is circulated through the well by introducing the drilling fluid within the well and then to contact with the formation and withdrawing the drilling fluid from the well to remove drill cuttings. A clay stabilizing agent is entrained in the drilling fluid. The clay stabilizing agent comprises a reaction product of a base reactant selected from the group consisting of an aliphatic polyamine, a heterocyclic polyamine, an alkylalkanol polyamine and mixtures thereof. The secondary reactant is selected from the group consisting of a carbamide, an alkylenecarbonate, a dialkylcarbonate and mixtures thereof. In one aspect of the invention, the base reactant is an aliphatic polyamine having a molecular weight within a range of 100–300 which is reacted with the carbamide and a dialkylcarbonate. Preferably, the base reactant is reacted with urea followed by reaction of the resulting intermediate reaction product with dimethyl carbonate. Subsequent to formation of the clay stabilizing agent, it is contacted with an acidifying agent such as acetic acid to reduce the pH of the stabilizing agent. The stabilizing agent is thereafter incorporated into the water base drilling fluid which has an alkaline pH. In a further embodiment of the present invention, the clay stabilizing agent comprises the reaction product of a polyamine base reactant of the type described above with a dialkyl carbonate such as dimethyl carbonate. Here, the resulting reaction product is added to the water-base drilling fluid as described above, preferably after contact with an acidifying agent such as acetic acid. In yet a further embodiment of the invention, a polyamine base reactant of the type described previously is reacted with a carbamide, urea, which can be employed directly in the drilling fluid without subsequent reaction with a dialkylcarbonate.

In yet a further aspect of the invention, a low molecular weight alkyl acid phosphate is used as a supplement to the clay stabilizing agent of the present invention. The alkyl acid phosphate preferably is ethyl acid phosphate, propyl acid phosphate or butyl acid phosphate. Mixtures of these materials can also be used. Preferably this supplement comprises ethyl acid phosphate. The ethyl acid phosphate, or other low molecular weight alkyl acid phosphate, preferably is added to the stabilizing product of the present invention in an aqueous solution subsequent to acidification of the product as described previously.

DETAILED DESCRIPTION OF THE INVENTION

In rotary drilling there is employed a drill string which carries on its lower end a drill bit having one or more openings for the discharge of drilling mud from the drill string into the well. The drill string extends through a rotary table on the floor of the drilling rig and is supported by the rig by means of a drawworks system. The drill string, along with the drill bit, is rotated by the rotary table. Typically, the drilling mud is withdrawn from a mud pit near the surface of the well and passed into the drill string via a rotary swivel. The drilling mud is pumped downwardly through the drill string and outwardly into the well bore through the outlet ports in the drill bit. The mud then is pumped to the surface of the well through the annulus between the drill string and the wall of the well. At the surface of the well, the mud may be passed through a suitable separation zone, where drill cuttings and other entrained solids are separated, and thence passed to the suction pit for reintroduction into the drill string. Additional clay and additives, including the clay stabilizing agents of the present invention, can be added during circulation.

As an alternative to the more conventional rotary table rig, the rotary drilling operation can·be carried out employing a flexible tubing having a bit which is rotated by a drill motor at the end of the tubing. The tubing is, of course, not rotated. In this case, the tubing is run into the well or withdrawn from the well through the use of a drum or reel type arrangement from which the tubing is paid out from the drawworks supporting the tubing. This approach may be used wherever it is desired to drill so-called deviated wells which can deviate from the vertical by as much as 90°.

As noted previously, the present invention provides a method for increasing the stability of formations penetrated by a well during the drilling thereof with water-base mud. By the term "water-base mud", as used herein and in the appended claims, is meant a drilling mud having an aqueous liquid base and containing suspended solids therein.

The suspended solids in the drilling mud take the form of day particles as described previously. Such clays typically are of the kaolinite, montmorillonite, or illite groups. The days in addition to imparting desirable thixotropic properties to the drilling mud, also serve to coat the walls of the well with an impermeable sheath, commonly termed a "filter cake" which prevents the loss of the drilling mud from the well into the formations penetrated by the well. Exemplary of the clays which may be utilized in water-base drilling muds is bentonite which is a member of the montmorillonite group. The bentonite is dispersed within the aqueous liquid as colloidal particles and imparts various degrees of thixotropy to the mud.

In addition to the days such as mentioned above, the aqueous drilling mud also may contain one or more weighing agents which function to increase the density of the mud such that it will offset high pressures which may be encountered during the drilling operation. Examples of such weighing agents are heavy minerals such as barite (barium sulfate) and other minerals such as hematite (ferrous oxide).

Similarly, as in the case of the various drilling fluid additives described previously, the formulations employed in the present invention preferably are derived from relatively low molecular weight polyamines such as described in the various prior art references identified above. Specifically, the polyamine base reactant can be a polyaliphatic polyamine, a heterocydie polyamine, or an alkylalkanol polyamine or mixtures thereof having an average molecular weight within the range of about 100–500. Preferred polyaliphatic polyamines include the ethylene based polyamines such as diethylenetriamine (DETA), triethylenetetramine (TETA) and tetraethylenepentamine TEPA) although the corresponding polypropylene polyamines, or polybutylene polyamine may also be employed. Such polyamines may be linear or branch chained as described previously, although relatively low molecular weight linear polyethylene polyamines such as DETA, TETA or TEPA will usually be preferred.

These polyakylene polyamines may be characterized by the following general formula:

$$NH_2(RNH)_n R\ NH_2 \quad (1)$$

wherein R is an alkylene group containing 2–6 carbon atoms, preferably 2 or 3 carbon atoms, and n is an integer from 1–5, preferably 1–3.

Preferred alkylalkanol polyamines which can be used in carrying out the invention may be characterized by the formula:

$$NH_2(R'NH)_n R''\text{-}OH \quad (2)$$

wherein R' is an alkylene group, and R" is an alkanol group each containing 2–6 carbon atoms, preferably 2 or 3 carbon atoms, and n is an integer from 1–5, preferably, 1–3. Preferred alkylalkanol polyamines including hydroxyalkylalkylenediamines such as aminoethylethanolamine, hydroxyalkyldialkylenetriamines such as aminodiethylethanoltriamine and hydroxyalkyltrialkylenetetramines such as triethylalkanoltriamine. Heterocyclic polyamines which may be used in carrying out the present invention include mononuclear heterocyclics such as aminoethylpiperazine and fused ring heterocyclics such as hexamethylenetetramine (ItMTA). Preferably the polyamine reactant is a linear polyamine selected from the group consisting of ethylenediamine, diethylenetriamine, triethylenetetramine or tetraethylenepentamine and mixtures thereof. The linear polyamine reactant may include one or more of the other polyamines described above, i.e. a heterocyclic polyamine or an alkylalkanol polyamine. Linear polyamine may also include other monofunctional substituents such as triethanolamine or ethyldiethanolamine.

Preferred embodiments of the present invention involve the use of an additive prepared by a reaction route utilizing the polyaliphatie polyamine as the base reactant which is reacted with a dialkylearbonate, or urea and a dialkylcarbonate. As noted previously, the preferred polyaliphatic polyamines are diethylenetriamine, triethylenetetramine, and tetraethylene-pentamine. These embodiments of the invention will be described with respect to diethylenetriamine (DETA), although it will be recognized by those skilled in the art that the following comments are applicable to use of TETA or TEPA as the base reactant.

One of the additives preferred for use in the present invention can be characterized as the reaction product of DETA with a dialkyl carbonate characterized by the formula:

$$\begin{array}{c} O \\ \| \\ R'-O-C-O-R' \end{array} \quad (3)$$

wherein each R' is an alkyl radical which may be the same or different and which may contain from 1–4 carbon atoms. The preferred dialkylcarbonate is dimethyl carbonate.

The polyamide produced by the reaction of a polyalkyl polyamine of Formula (1), e.g., diethylenetriamine and a dialkylcarbonate of formula (3) may be characterized by the following formula:

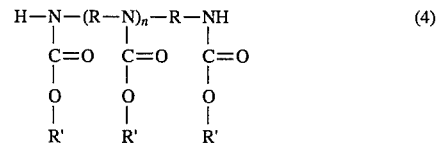

$$\begin{array}{cccc} H-N-(R-N)_n-R-NH & & & (4) \\ | & | & | & \\ C=O & C=O & C=O & \\ | & | & | & \\ O & O & O & \\ | & | & | & \\ R' & R' & R' & \end{array}$$

wherein R and n are as defined in Formula (1) and R' is as defined in Formula (3).

The polyamide products of Formula (4) can be formed by heating the diethylenetriamine (or other polyamine) to a temperature of about 120° F. to initiate the reaction followed by the addition of the molecular equivalent amount or less of the dimethyl carbonate. For the reaction of diethylenetriamine and dimethyl carbonate, since there are three reactive sites, the stoichiometrie amount of dimethyl carbonate is three moles per mole of DETA. However, experimental work respecting the invention has shown good results with the reaction of two moles of DMC with one mole of DETA. In carrying out the reaction, the temperature of the diethylentriamine is heated to 120° F., the dimethyl carbonate is slowly added with mild stirring. The reaction is exothermic and the temperature increases to about 150°–160° F.

At the conclusion of the reaction, water can be added in an amount to provide a water solution containing about 33 wt. percent of the polyamide. The resulting product is mildly alkaline, having a pH within the range of about 9–11. It is preferred to reduce the pH to a value which is neutral or mildly acidic, for example to a pH within the range 6–7, more preferably 6.5–7, by any suitable technique such as by the addition of an organic acid such as acetic acid. As described in greater detail below, this treatment results in a substantially improved performance when the product is ultimately added to the drilling mud or other well servicing fluid. Where the reactants are diethylenetriamine and three moles of dimethyl carbonate, the resulting polyamide, is indicated by the formula:

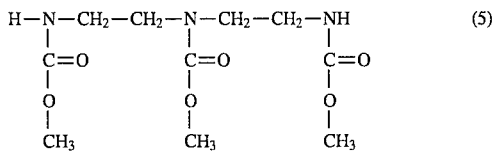

As indicated by the experimental work reported hereinafter, various mixtures of diethylenetriamine and other base reactants can also be employed. Specifically, mixtures include those incorporating polyalkanolamines and alkylalkanolamines specifically, aminoethylethanolamine.

Another preferred additive for use in the present invention involves the reaction of a suitable base reactant such as described immediately above with dimethyl carbonate, and a carbamide, specifically urea. In this embodiment of the invention, the diethylenetriamine is reacted with a mole equivalent amount of urea followed ultimately by the addition of dimethyl carbonate in a stoichiometrically equivalent amount, or an amount slightly less than the stoichiometric equivalent. The initial reaction of the diethylenetriamine and urea is highly exothermic, such that at the conclusion of the reaction the temperature is about 170°–190° F. Before the dimethyl carbonate is added, the reaction solution should be cooled to a temperature of about 150°–160° F. At the conclusion of addition of the dimethyl carbonate, water can be added, the reaction solution cooled, and the pH then reduced as described above through the addition of acetic acid or other suitable acid. While the several reactants can be employed in different relative amounts, it has been found suitable to employ the components in the following relative mole amounts: 1 mole DETA, 1 mole urea, 2 moles dimethyl carbonate.

The polyamine condensate produced from this two step reaction can be characterized by the following general formula:

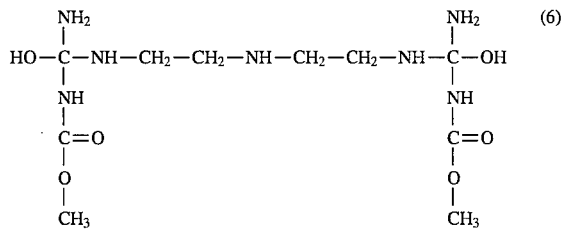

As will be recognized by those skilled in the art, the urea and dimethyl carbonate can react on any of the nitrogen molecules.

As noted previously, it is important before adding the product to a drilling fluid to decrease the pH of the product to a mildly acidic to neutral range. It usually will be preferred to adjust the product to a pH within the range of 6.5–7.0, more specifically, a value of about 6.8. This, of course, is in direct contrast to prior art practices such as disclosed in the aforementioned patent to Patel in which acidic products are initially produced and the pH then increased by the addition of a strong potassium hydroxide solution.

As will be recognized by those skilled in the art, the reaction of diethylenetriamine with hydroxyacetic acid such as disclosed in the aforementioned patents to De Groom and Patel produce amide type structures having acidic functional groups. The functional groups of the products of the present invention are basic in nature.

The stabilizing additives employed in the present invention are added to the drilling fluid or other well servicing fluid in a concentration to inhibit day swelling and stabilize the well bore. The amount of additive to be added can be readily determined through controlled experiments such as those described below. As a practical matter, the additive should be added in an amount of about ¼ pound to about 10 pounds per barrel. in most eases, it will be preferred to provide the additive in a concentration within the range of about 3–8 pounds per barrel.

In the following examples, the product was prepared using the reactants in the relative amounts as indicated to produce a product with the additives as indicated and which was ultimately treated with acetic acid to provide a pH within the range of about 6.5–7. Viscosities for the mud system were then measured. In each case unless indicated otherwise, the product was added in an amount of 5 gm of product to 331 ml of water. The resulting solution was stirred for about 2–10 minutes while 50 gms of bentonite were added, and the viscosity was then measured at shear rates ranging from 3–600 rpm on a Fann viscosimeter. The resulting rheological properties show that in each case where the additive disclosed is used, significant inhibition of the bentonite is achieved.

The experimental work respecting the present invention was carried out using various base reactants with dimethyl carbonate (referred to in the following experimental work as DMC) and urea together with certain other additives added once the formulation was prepared and added to the drilling mud.

The base reactants used in this experimental work were diethylenetriamine (DETA), aminoethylpiperizene (AEP), aminoethylethanolamine (AEEA), hexamethylenetetramine (HMTA), triethylenepentamine (TEPA). Mixtures of base reactants were also used in certain experimental work. One, identified as amine HH was a mixture of aminoethylpiperizene and tdethylenetetramine. The other, identified as amine 770, was a mixture of aminoethylpiperizene, diethylentriamine and aminoethylethanolamine. In each case unless otherwise indicated, the pH was adjusted to a slightly acidic value by acetic acid. In some cases, secondary additives, including glycol, potassium chloride, and ethyl acid phosphate were also employed. In all products reacted and formulated, the final product was completely water soluble and had compatibility with other additives which are typically used in water based drilling muds.

EXAMPLE 1

Example 1 involved the reaction of one mole diethylenetriamine and three moles of dimethyl carbonate. The DETA was heated to around 120° F. to initiate the reaction and the DMC added slowly since the reaction is exothermic and the temperature will rapidly increase to about 150° F. + or more. The addition of DMC was controlled to maintain the temperature within the range of about 150°–160° F. After addition of the stoichmetric amount of DMC, the reaction product was cooled with the addition of water to adjust the activity to about 33%, i.e., the reaction product was present in the aqueous solution in a concentration of about 33 wt/%.

To evaluate the performance of this product, 5 grams of product were added to 331 cc of water and mixed 1–2 minutes before 50 grams ofbentonite were added to the system. After mixing for 10 minutes at 70 volts on a Hamilton Beach mixer, the rheology of this system was measured with a Fann VG-meter at ambient temperature. The initial aqueous solution of the product was mildly alkaline as described above. The Farm readings were taken at RPM's ranging from 3–600 and the Fann viscosimeter readings at these speeds are set forth in the following table. The notation "TTM" indicates that the initial clay suspension was too thick to measure.

TABLE IA

| RPM | Rheology Initial |
|---|---|
| 600 | TTM |
| 300 | 248 |
| 200 | 202 |
| 100 | 143 |
| 6 | 57 |
| 3 | 57 |

The pH of this reaction product was then adjusted to slightly acidic, about 6.8, and again tested as described above using 331 cc water, 5 grams of product and 50 grams of bentonite. Measurements were again taken on the Fann viscosimeter for the initial clay suspension and for the clay suspension after aging for 16 hours at a temperature of 180° F. As indicated by the viscosimeter readings reported in the following table, by slightly acidifying the product before adding it to the aqueous solution, the effectiveness of the product in inhibiting clay swelling was substantially enhanced. Moreover, the product remained relatively effective even after the heat aging protocol.

TABLE IB

| RPM | Rheology Initial | Heat Aged 16 hrs @ 180° F. |
|---|---|---|
| 600 | 110 | 153 |
| 300 | 80 | 130 |
| 200 | 68 | 112 |
| 100 | 55 | 106 |
| 6 | 43 | 88 |
| 3 | 43 | 88 |

Potassium chloride is compatible with the product of the present invention and is a known clay stabilizer because of the ionic structure and size of the potassium ion. Potassium chloride was added in an amount of 10 wt. percent to the product of this Example 1 after the pH was adjusted to 6.8. The same protocol as described immediately above was followed in which 5 gms of the product was added to 331 cc of water followed by 50 gms of bentonite. The rheology of the initially formed clay system and this system heat aged for 16 hrs at 180° F. as described above was determined and the results are as set forth below.

TABLE IC

| RPM | Rheology Initial | Heat Aged 16 hrs @ 180° F. |
|---|---|---|
| 600 | 82 | 153 |
| 300 | 62 | 130 |
| 200 | 55 | 112 |
| 100 | 48 | 106 |

TABLE IC-continued

| RPM | Rheology Initial | Heat Aged 16 hrs @ 180° F. |
|---|---|---|
| 6 | 36 | 88 |
| 3 | 36 | 88 |

To provide a basis for comparison to indicate the effectiveness of the product of the present invention, a base system to which no stabilizing agent was added was tested. Here, 50 gms of bentonite were added to 331 cc water and then stirred for 10 minutes. Thereafter, the Farm measurements were taken, as described previously, with the following results.

TABLE ID

| RPM | Rheology Initial |
|---|---|
| 600 | TTM |
| 300 | TTM |
| 200 | TTM |
| 100 | TTM |
| 6 | TTM |
| 3 | TTM |

*TTM = Too thick to measure

As previously noted, relative amounts of the polyamine and dimethyl carbonate other than using the stoichmetric amount of DMC, can be used; for example the product of one mole of DETA and two moles of DMC gives an effective shale stabilizer.

EXAMPLE 2

Another stabilizing agent of the present invention was formulated by reacting diethylenetriamine, urea and dimethyl carbonate. Here, one mole of DETA was reacted with one mole of urea as a 50% solution. The addition of urea is very exothermic and the temperature rapidly rose to about 170°–180° F. After addition of the urea, the reaction was allowed to cool to around 150° F. and then two moles of dimethyl carbonate were slowly added as this reaction is also exothermic and the temperature should be maintained below about 175° F. After addition of the DMC the reaction product was cooled and diluted by the addition of water to an activity of about 33 wt. percent.

The performance of this reaction product was evaluated by adding 5 grams of the product to 331 cc of water and then adding 50 grams of bentonite. The rheology as determined by the Fann measurements is as follows:

TABLE IIA

| RPM | Rheology Initial |
|---|---|
| 600 | TTM |
| 300 | TTM |
| 200 | 293 |
| 100 | 227 |
| 6 | 90 |
| 3 | 90 |

The pH of this product was adjusted to a slightly acidic value 6.7 and the rheology again tested initially and after aging for 16 hours at 180° F.

TABLE IIB

| | Rheology | |
|---|---|---|
| RPM | Initial | Heat Aged 16 hrs @ 180° F. |
| 600 | 129 | 250 |
| 300 | 92 | 192 |
| 200 | 77 | 172 |
| 100 | 65 | 156 |
| 6 | 48 | 114 |
| 3 | 48 | 114 |

To this product with the pH adjusted as above, 10% potassium chloride was added and then the rheology again tested. Here, the product was heated 16 hours at 300° F.

TABLE IIC

| | Rheology | |
|---|---|---|
| RPM | Initial | Heat Aged 16 hrs @ 300° F. |
| 600 | 80 | 218 |
| 300 | 61 | 169 |
| 200 | 54 | 154 |
| 100 | 46 | 151 |
| 6 | 35 | 113 |
| 3 | 35 | 113 |

In another embodiment of the invention, a low molecular weight alkyl acid phosphate is employed in conjunction with a reaction product of the present invention to provide a hydralion inhibitor/shale stabilizer of enhanced effectiveness. The additional additive used in this embodiment of the invention is a low molecular weight alkyl acid phosphate characterized in the prior art as a complex mono- and di-phosphoric acid esters which have been evaluated and used in the past in some systems as thinners in drilling fluids. In such prior uses, a disadvantage was that they caused foaming in many drilling systems leading to serious problems in the course of the drilling operation. In the present invention, when such alkyl acid phosphates are used in conjunction with products such as the DETA/DMC, the DETA/urea/DMC and the DETA/urea reaction products, the foaming characteristics are not present. Suitable low molecular weight alkyl acid phosphates for use in this embodiment of the invention include ethyl acid phosphate, propyl acid phosphate and butyl acid phosphate. The preferred alkyl acid phosphates are selected from the group consisting of ethyl acid phosphate and propyl acid phosphate. The butyl acid phosphate is also satisfactory although it is slightly less effective than the propyl acid phosphate. The ethyl acid phosphate, in turn, gives generally better results than the propyl acid phosphate.

This embodiment of the invention involving the use of a low molecular weight alkyl acid phosphate is also advantageous where the reaction product of an aliphatic polyamine and urea is used to provide clay stabilization. The reaction product of a polyamine such as diethylenetriamine with urea is a less effective hydralion suppressant/shale stabilizer than the product produced by the DETA/urea/DMC system. When a low molecular weight alkyl acid phosphate is added to the DETA/urea reaction product, substantially improved results can be obtained. The alkyl acid phosphate used in the following experimental work was ethyl acid phosphate having an acid number (mg KOH/gm) of about 540–590. The product contained approximately equal molar concentrations of the mono- and di-esters and exhibited a $P_2O_5$ content of about 52 wt. percent. The corresponding n-butyl acid phosphate, also containing approximately equal molar concentrations of the mono- and di-esters, exhibits an acid number (mg KOH/gm) of about 430–505 and a $P_2O_5$ content of about 38–40 wt. percent.

Only a small amount of the alkyl acid phosphate need be used in order to substantially enhance the effectiveness of the clay stabilizing agent. Where the clay stabilizing agent is present in an aqueous solution having an activity of about one-third, i.e. about 33 wt. percent of clay stabilizing agent in the aqueous solution, only about 2 or 3 wt. percent of ethyl acid phosphate need be added to the aqueous solution. Higher concentrations can be used, but they are unnecessary and in fact, may be slightly deleterious. That is, the addition of ethyl acid phosphate in amount of 10 wt. percent to a 33% active solution may be slightly less effective then the addition of 2–5 wt. percent. The concentration of the alkyl acid phosphate added to the clay stabilizing agent, when stated in terms of a percent of the active ingredient should normally be within the range of about 5–15 wt. percent and more specifically, about 5–10 wt. percent. That is, when 2 wt. percent ethyl acid phosphate is added to a 33% active solution, the amount of ethyl acid phosphate expressed as a percentage of active ingredient would be about 6%.

EXAMPLE 3

In this example, 1 mole of DETA was reacted with 2 moles of dimethyl carbonate as described previously. Upon completion of the reaction, the reaction product was diluted to 33% and the pH adjusted to 6.8 with acetic acid and then 2% by weight of ethyl acid phosphate added to the diluted product. The final blend was then tested using 331 cc of water, 5 grams of product and 50 grams of bentonitc. The results show that there is a synergistic effect in which the final formulation is more effective in lowering the rheological properties of a bentonitc system, indicating less hydration of the bentonitc. The amount of alkyl acid phosphate employed in terms of pounds per barrels of drilling fluid would depend to some extent upon the amount of clay stabilizing agent added to the drilling fluid. Normally, the ethyl acid phosphate or other alkyl acid phosphate employed in the present invention should be added to the drilling fluid amount of about ½ to 1 ½ pounds per barrel and preferably, about ½ to 1 pound per barrel. Greater or lesser mounts could, of course, be used.

TABLE III

| | Rheology | |
|---|---|---|
| RPM | Initial | Heat Aged |
| 600 | 57 | 150 |
| 300 | 38 | 122 |
| 200 | 32 | 108 |
| 100 | 26 | 102 |
| 6 | 17 | 80 |
| 3 | 18 | 80 |

EXAMPLE 4

In this example, 2 wt. percent ethyl acid phosphate was added to the reaction product of DETA/urea after the exothermic reaction had been carried to conclusion and sufficient water added to dilute the reaction product to a concentration of 33 wt. percent followed by the addition of acetic acid to adjust the pH to a value of 6.7. As shown by the results set forth below, this system when combined with the low molecular weight alkyl acid phosphate provides a very effective hydration suppressant/shale stabilizer.

TABLE IV

| RPM | Rheology Initial | Heat Aged 16 hrs @ 180° F. |
|---|---|---|
| 600 | 35 | 60 |
| 300 | 24 | 50 |
| 200 | 20 | 45 |
| 100 | 17 | 43 |
| 6 | 14 | 37 |
| 3 | 15 | 37 |

As previously noted, phosphate esters have, over the years, been evaluated and used in some systems as thinners in drilling fluids. A substantial disadvantage to their use was that they caused severe foaming in many systems which creates problems in drilling operations. A unique feature of this system embodied in the present invention is that when the alkyl acid phosphates are used in conjunction with DETA/DMC and DETA/urea/DMC and DETA/urea, there was no foaming observed. Other low molecular phosphates also produce good results.

EXAMPLE 5

This example involved the reaction of ⅔ mole DETA, ⅓ mole urea and 2½ mole DMC. The final product, containing 30% product, 10% glycol, 12% potassium chloride and 57% water as described above, was acidified to a pH of 6.7 by the addition of acetic acid. grams of product were added to 300 ml of water followed by 45 gm of clay. Viscosimeter measurements were taken after the addition of clay and after aging as indicated. The results are set forth below:

TABLE V

| RPM | Rheology Initial | Heat Aged 16 hrs @ 180° F. |
|---|---|---|
| 600 | 94 | 135 |
| 300 | 69 | 100 |
| 200 | 60 | 89 |
| 100 | 49 | 80 |
| 6 | 35 | 62 |
| 3 | 35 | 62 |

EXAMPLE 6

Example 6 involved the reaction of ½ mole DETA, ½ mole urea and 2 moles DMC. The product, having the same relative concentrations as Example 5, was acidified to a pH of 6.8 with acetic acid and Fann viscosimeter runs were carried out as described previously:

TABLE VI

| RPM | Rheology Initial | Heat Aged 16 hrs @ 180° F. |
|---|---|---|
| 600 | 78 | 130 |
| 300 | 58 | 104 |
| 200 | 51 | 93 |
| 100 | 43 | 86 |

TABLE VI-continued

| RPM | Rheology Initial | Heat Aged 16 hrs @ 180° F. |
|---|---|---|
| 6 | 31 | 67 |
| 3 | 31 | 68 |

EXAMPLE 7

Example 7 was carried out following the procedure set forth in Example 6 except that the formulation containing the clay was aged 16 hours at 300° F. rather than 18 hours at 180° F. The results are as follows:

TABLE VII

| RPM | Rheology Initial | Heat Aged 16 hrs @ 300° F. |
|---|---|---|
| 600 | 70 | 218 |
| 300 | 52 | 169 |
| 200 | 44 | 154 |
| 100 | 37 | 151 |
| 6 | 26 | 113 |
| 3 | 26 | 113 |

EXAMPLE 8

In this example, 1 mole DETA was reacted with 1 mole of urea and the reaction product diluted with water to provide a 30% aqueous solution. 2 wt. percent ethyl acid phosphate was added to the final solution. The pH of the initial product was 10.7 and two acetified solutions were produced, both having a pH of 6.9 by acetic acid, one containing 10% potassium chloride and the other free of potassium chloride.

TABLE VIIIA

| RPM | Rheology Initial | Heat Aged 16 hrs @ 180° F. w/no KCl |
|---|---|---|
| 600 | 41 | 45 |
| 300 | 29 | 32 |
| 200 | 23 | 27 |
| 100 | 18 | 22 |
| 6 | 13 | 16 |
| 3 | 13 | 16 |

TABLE VIIIB

| RPM | Rheology Initial | Heat Aged 16 hrs @ 180° F. w/KCl |
|---|---|---|
| 600 | 32 | 33 |
| 300 | 22 | 23 |
| 200 | 18 | 18 |
| 100 | 14 | 16 |
| 6 | 9 | 12 |
| 3 | 9 | 12 |

EXAMPLE 9

Here the base reactant was produced from DETA in an amount of 1 mole, ½ mole of urea in a solution containing 30 ml of water and 1 mole of DMC. The reaction product was diluted with 1 part of product in 3.3 wt. percent parts of water and then acidified with acetic acid to a pH of about 6.5.

TABLE IX

| | Rheology | |
|---|---|---|
| RPM | Initial | Heat Aged 16 hrs @ 180° F. |
| 600 | 75 | 85 |
| 300 | 53 | 60 |
| 200 | 44 | 47 |
| 100 | 35 | 38 |
| 6 | 23 | 26 |
| 3 | 23 | 26 |

EXAMPLE 10

In this example, 1 mole of the amine mixture, identified previously as HH, was reacted with ½ mole of urea in 30 gm of water. This reaction product was then reacted with ½ mole of DMC and the pH was adjusted to 6.3 with acetic acid. Viscosimeter tests were carried out after 5 gm of product had been added to 331 ml water and 50 gm of bentonite. Properties were measured both initially and after heat aging for 18 hrs. at 180° F.

TABLE X

| | Rheology | |
|---|---|---|
| RPM | Initial | Heat Aged 18 hrs @ 180° F. |
| 600 | 70 | 83 |
| 300 | 42 | 56 |
| 200 | 33 | 45 |
| 100 | 25 | 31 |
| 6 | 15 | 19 |
| 3 | 15 | 19 |

EXAMPLE 11

The same procedure as set forth in example 10 was employed except the product was diluted to 33% activity and 15 wt. percent glycol and 10 wt. percent potassium chloride added. The pH remained at 6.5.

TABLE XI

| | Rheology |
|---|---|
| RPM | Initial |
| 600 | 118 |
| 300 | 84 |
| 200 | 58 |
| 100 | 40 |
| 6 | 21 |
| 3 | 20 |

EXAMPLE 12

In this example, 1 mole of AEEA was reacted with 1 mole of urea in 50 gm of water followed by reaction with ½ mole of DMC. The product was neutralized to a pH of 6.7 with acetic acid. 5 gm of the undiluted product was added to 331 ml of water.

TABLE XII

| | Rheology |
|---|---|
| RPM | Initial |
| 600 | 32 |
| 300 | 26 |
| 200 | 22 |
| 100 | 18 |
| 6 | 13 |
| 3 | 14 |

EXAMPLE 13

Example 13 followed the same protocol as Example 6 except the product was dissolved in a mixture containing 10 wt. percent ethyl acid phosphate in addition to potassium chloride, resulting in the same concentration 30 wt. percent of the product in the formulation.

TABLE XIII

| | Rheology | |
|---|---|---|
| RPM | Initial | Heat Aged 16 hrs @ 180° F. |
| 600 | 47 | 83 |
| 300 | 42 | 59 |
| 200 | 26 | 52 |
| 100 | 19 | 43 |
| 6 | 11 | 30 |
| 3 | 11 | 30 |

EXAMPLE 14

This example followed the same procedure as Example 13 except the ethyl acid phosphate was added in an amount of 5 wt./% and the 18 hour aging period was at 150° F.

TABLE XIV

| | Rheology | |
|---|---|---|
| RPM | Initial | Heat Aged 18 hrs @ 150° F. |
| 600 | 38 | 80 |
| 300 | 26 | 57 |
| 200 | 21 | 50 |
| 100 | 16 | 42 |
| 6 | 9 | 40 |
| 3 | 8 | 40 |

Having described specific embodiments of the present invention, it will be understood that modifications thereof may be suggested to those skilled in the art, and it is intended to cover all such modifications as fall within the scope of the appended claims.

We claim:

1. In a method for the drilling of a well penetrating a subterranean formation, the steps comprising:
   a) circulating a water-based drilling fluid through said well by introducing said drilling fluid into said well and into contact with said formation and withdrawing said drilling fluid from said well to remove cuttings therefrom; and b) entraining in said drilling fluid, a clay stabilizing agent comprising the reaction product of polyamine base reactant selected from the group consisting of an aliphatic polyamine, a heterocyclic polyamine and an alkylalkanol polyamine and mixtures thereof with a functional reactant selected from the group consisting of a carbamide, a dialkylcarbonate, and mixtures thereof.

2. The method of claim 1 wherein said clay stabilizing agent includes a low molecular weight alkyl acid phosphate selected from the group consisting of ethyl acid phosphate, propyl acid phosphate, butyl acid phosphate and mixtures thereof.

3. The method of claim 2 wherein said low molecular weight alkyl acid phosphate comprises ethyl acid phosphate.

4. The method of claim 3 wherein said ethyl acid phosphate is present in said clay stabilizing agent in amount within the range of 5–15% of said clay stabilizing agent.

5. The method of claim 1 wherein said polyamine base reactant comprises an aliphatic polyamine having at least three amino groups and a molecular weight within the range of about 100–300.

6. The method of claim 5 wherein said day stabilizing agent comprises the reaction product of said polyamine reactant with a carbamide and a dialkylcarbonate.

7. The method of claim 6, wherein said clay stabilizing agent is formed by the reaction of said polyamine reactant with a urea to form an intermediate reaction product followed by the reaction of said intermediate reaction product with dimethyl carbonate.

8. The method of claim 7 wherein said polyamine reactant comprises an aliphatic polyamine selected from the group consisting of diethylenetriamine, triethylenetetramine and mixtures thereof.

9. The method of claim 1 wherein said clay stabilizing agent comprises the reaction product of said polyamine reactant with a dialkylcarbonate.

10. The method of claim 9 wherein said polyamine reactant comprises an aliphatic polyamine having at least three amino groups and a molecular weight within the range 100–300.

11. The method of claim 10 wherein said day stabilizing agent includes a low molecular weight alkyl acid phosphate selected from the group consisting of ethyl acid phosphate, propyl acid phosphate, butyl acid phosphate and mixtures thereof.

12. The method of claim 1 wherein said day stabilizing agent comprises the reaction product of said polyamine reactant with dimethyl carbonate.

13. The method of claim 12 wherein said polyamine reactant comprises an aliphatic polyamine having at least three amino groups and a molecular weight within the range of 100–300.

14. The method of claim 13 wherein said day stabilizing agent includes a low molecular weight alkyl acid phosphate selected from the group consisting of ethyl acid phosphate, propyl acid phosphate, butyl acid phosphate and mixtures thereof.

* * * * *

UNITED STATES PATENT AND TRADEMARK OFFICE
CERTIFICATE OF CORRECTION

Patent No.: 5,558,171

Dated: September 24, 1996

Inventors: Raymond E. McGlothlin and Frank B. Woodworth

It is certified that error appears in the above-identified patent and that said Letters Patent are hereby corrected as shown below:

Claim 6, column 17, line 23, after "said" change "day" to --clay--.

Claim 11, column 18, line 12, after "said" change "day" to --clay--.

Claim 12, column 18, line 17, after "said" change "day" to --clay--.

Claim 14, column 18, line 24, after "said" change "day" to --clay--.

Signed and Sealed this

Twenty-sixth Day of November 1996

Attest:

BRUCE LEHMAN

*Attesting Officer*    Commissioner of Patents and Trademarks